UNITED STATES PATENT OFFICE.

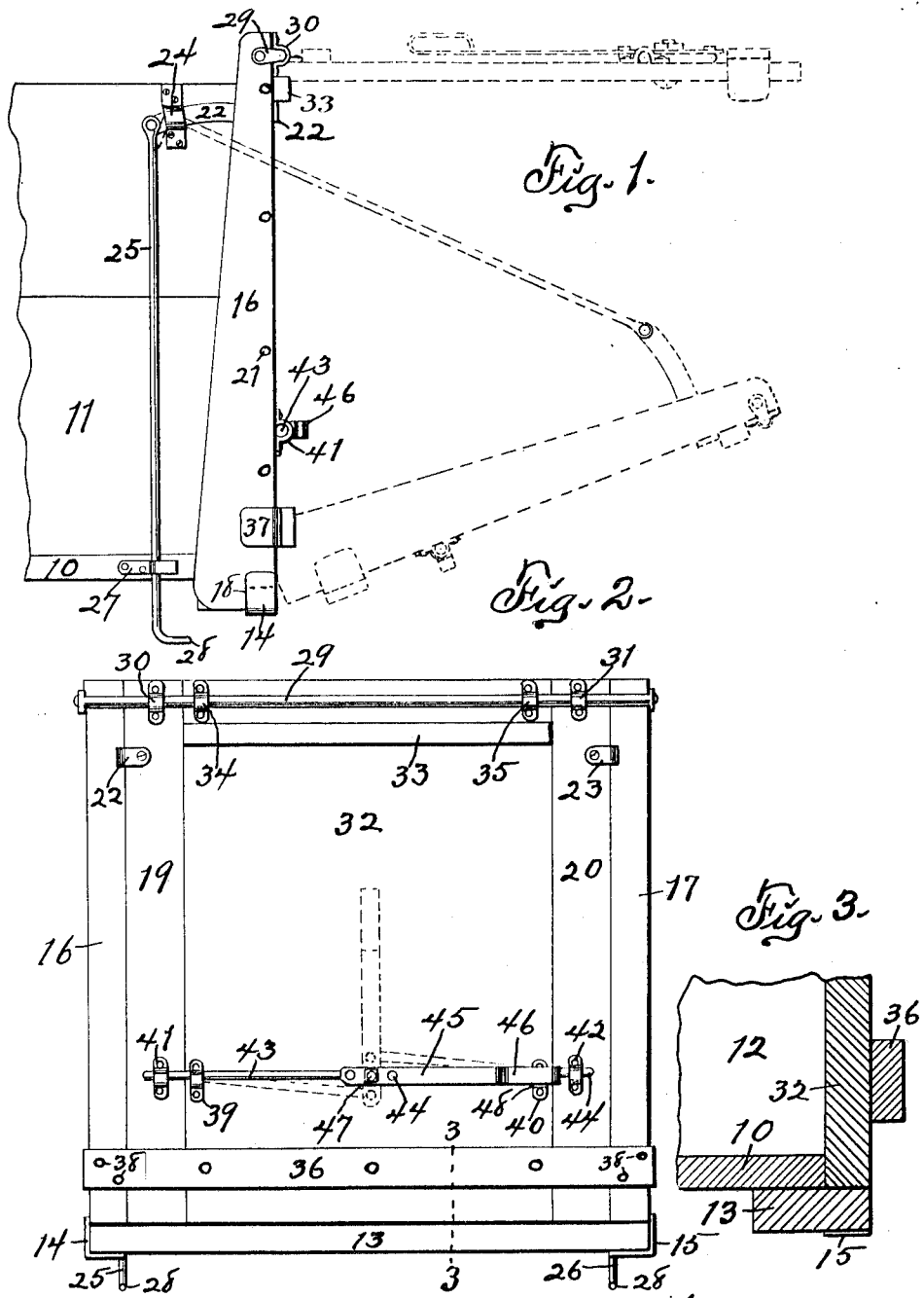

ROBERT G. PING, OF AUDUBON, IOWA, ASSIGNOR OF ONE-HALF TO HIMSELF, ONE-FOURTH TO JOHN A. NASH, AND ONE-FOURTH TO L. D. PHELPS, OF AUDUBON, IOWA.

WAGON END-GATE.

1,035,901.   Specification of Letters Patent.   Patented Aug. 20, 1912.

Application filed April 6, 1911. Serial No. 619,889.

*To all whom it may concern:*

Be it known that I, ROBERT G. PING, citizen of the United States of America, and resident of Audubon, Audubon county, Iowa, have invented a new and useful Wagon End-Gate, of which the following is a specification.

The object of this invention is to provide an improved construction for wagon endgates and shoveling-boards.

A further object of this invention is to provide an improved construction for a relief door in a wagon endgate.

A further object of this invention is to provide an improved construction whereby a wagon endgate may be turned into recumbent position on the top of a wagon box for the purpose of opening the end of said box for loading or unloading animals such as swine and sheep.

My invention consists in the construction, arrangement and combination of elements hereinafter set forth, pointed out in my claims and illustrated by the accompanying drawing, in which—

Figure 1 is a side elevation showing my improved device in position for practical use as an endgate, dotted lines indicating two different open positions of the device. Fig. 2 is a rear end elevation showing the device in closed position, dotted lines indicating the locking devices in open position. Fig. 3 is a vertical section, on an enlarged scale, on the indicated line 3—3 of Fig. 2.

In the construction and mounting of the device as shown the numeral 10 designates the bottom, 11, 12 the sideboards and 13 the rear cross-bar of a wagon box of ordinary and usual construction. Clips or angle irons 14, 15 are fixed to and project above end portions of the cross-bar 13 and wings 16, 17 are mounted vertically across and project above and below the rear end portions of the sideboards 11, 12. The wings are formed with notches 18 in their lower rear corners, which notches embrace projecting end portions of the cross-bar 13. Those portions of the wings 16, 17 immediately above the end portions of the cross-bar 13 are confined by upwardly projecting portions of the angle irons 14, 15. Frame bars 19, 20 are mounted vertically against the rear end portions of the sideboards 11, 12, rest at their lower ends on the rearwardly projecting portion of the cross-bar 13, and are arranged at right angles and fixed to the wings 16, 17 as by screws or nails 21. Hooks 22, 23 are mounted through notches in the wings 16, 17 and have their rear end portions extending partially across and fixed to the upper end portions of the frame bars 19, 20. Forward end portions of the hooks 22, 23 extend through clips 24 (one of which is shown in Fig. 1). Rods 25, 26 are pivoted at their upper ends to forward end portions of the hooks 22, 23 in front of the clips 24 and depend approximately vertically therefrom. The rods 25, 26 extend within rearwardly opening hooks 27 (one of which is shown in Fig. 1) and serve to hold the wings and frame bars in vertical positions as shown by straining on the clips 24. The hooks 27 are located in front of and slightly spaced from the lower end portions of the wings 16, 17 so that the rods 25, 26 may be removed and replaced manually relative to said hooks. Hooks 28 are formed on the lower end portions of the rods 25, 26 for a purpose hereinafter explained. A pivot bar 29 is mounted in bearings or clips 30, 31 on the rear faces of the upper end portions of the frame bars 19, 20 and extends across and connects said frame bars and the wings 16, 17. End portions of the pivot bar 29 extend forwardly partially across and are fixed to the side faces of the upper end portions of the wings 16, 17. A relief door 32, strengthened by a cross cleat 33 near its upper margin, is mounted betwen and fitted to the frame bars 19, 20.

The relief door 32 is pivotally connected at its upper end portion to the pivot bar 29 by means of clips 34, 35 journaled on said bar. A yoke bar 36 is fixed near its central portion to and extends across the lower end portion of the relief door 32. Angle irons 37 (one of which is shown in Fig. 1) are mounted between the wings 16, 17 and end portions of the yoke bar 36 and are secured to said yoke bar as by bolts 38. End portions of the angle irons 37, extend loosely partially across and in proximity to the outer faces of the lower end portions of the wings 16, 17 immediately above the angle irons 14, 15. Clips 39, 40 are mounted on the rear face of the relief door 32 immediately above the yoke bar 36 and clips 41, 42 are mounted on the frame bars 19, 20 adjacent thereto. The clips 39, 40, 41, 42 are in horizontal alinement but the clips 39, 40 are elongated vertically. Shot-bolts 43, 44 are mounted loosely through the clips 39—41 and 40—42 respectively. The shot-bolts are arranged to fit the clips 41, 42 snugly and to have freedom of vertical movement in the clips 39, 40. A lever 45, having a looped handle 46 at one end, is pivoted on a bolt 47 mounted in the relief door 32. The shot-bolt 43 is pivoted at one end to one end portion of the lever 45 and the shot bolt 44 is pivoted at one end to said lever. The points of pivoting of the shot-bolts to the lever 45 are equally spaced from and on opposite sides of the fulcrum bolt 47. A lug 48 is formed on the clip 40 and is adapted to receive and limit downward movement of the handle end portion of said lever.

When the parts are assembled as shown by solid lines in the drawing the relief door 32 is in closed position and is held rigidly to the frame bars 19, 20 by engagement of the shot-bolts 43, 44 in the clips 39, 40, 41, 42, and accidental disengagement of said shot-bolts is prevented by the lever 45 in recumbent position. At the same time the yoke bar 36 and angle irons 37 thereon supplement the angle irons 14, 15 in preventing spreading of the frame bars 19, 20 and wings 16, 17. At the same time the engagement of the notches 18 over the ends of the cross-bar 13 prevents rearward movement of the lower end portions of the wings 16, 17 and the upper portions of said wings (together with the frame bars and relief door) are held against rearward movement by the hooks 22, 23, clips 24, rods 25, 26 and hooks 27. When it is desired to use this device as a shoveling-board, the rods 25, 26 are released from the hooks 27 manually and raised through arcs forwardly into such positions that they may move rearwardly through the clips 24 and permit the entire endgate to assume an inclined position (or recumbent position, dependent on the length of the rods) as shown by lower dotted lines in Fig. 1, supported by the hooks 28 on said rods in engagement with the clips 24. When it is desired to dump the contents of the wagon box the lever 45 is moved manually through an arc into the position shown by dotted lines in Fig. 2 and in such movement said lever withdraws the shot-bolts 43, 44 from the clips 41, 42 and permits the relief door to swing rearwardly on the articulation provided by the pivot bar 29. When it is desired to load or unload animals, such as swine or sheep, the unlocked relief door may be raised to horizontal position or turned through an arc into recumbent position on the top of the sideboards 11, 12, such movement being suggested by the upper dotted lines in Fig. 1.

I claim as my invention—

1. A wagon end gate including side wings, frame bars secured thereto and extending longitudinally thereof, a pivot bar constituting the sole connection between the upper ends of the frame bars, a relief door hung upon said bar and adapted to close the space between the frame bars, a yoke bar fixedly secured to the relief door and extending beyond the sides thereof, angle irons upon the ends of the yoke bar and adapted to lap the outer sides of the wings to hold said wings against spreading when the relief door is in closed position therebetween, and means for fastening the relief door in closed position.

2. The combination with a wagon body including a rear cross bar and clips at the ends thereof, of an end gate removably mounted upon the rear bar and between the clips, said end gate including side wings, frame bars secured to the inner sides thereof, a pivot bar constituting the sole connection between the upper ends of the frame bars, a relief door hung therefrom and adapted to close the space between the frame bars, a yoke bar fixedly secured to relief door, angle irons at the ends thereof and adapted to lap the outer sides of the wings to hold said wings against spreading apart while the relief door is in closed position between the frame bars, coöperating means upon the relief door and frame bars for holding the door in closed position, hooks extending between the wings and the frame bars and secured thereto, clips upon the sides of the wagon body and slidably engaged by the hooks, rods pivotally connected to the hooks and normally extending therefrom, and holding devices upon the sides of the wagon body for engaging said rods to hold them against rearward movement relative to the end gate.

Signed by me at Audubon, Iowa, this 2nd day of March, 1911.

ROBERT G. PING.

Witnesses:
KARL RASMUSSEN,
LARS C. CHRISTOFFERSEN.

---

Copies of this patent may be obtained for five cents each, by addressing the "Commissioner of Patents, Washington, D. C."